United States Patent Office 2,900,358
Patented Aug. 18, 1959

2,900,358

PROCESS FOR COMPOUNDING CONJUGATED DIENE RUBBERS WITH CYCLOTETRATHIOTETRAIMINE AND PRODUCT OBTAINED THEREBY

Bobbie D. Stone, Miamisburg, and Morris L. Nielsen, Dayton, Ohio, assignors to Monsanto Chemical Company, St. Louis, Mo., a corporation of Delaware No Drawing. Application December 12, 1956
Serial No. 627,749

15 Claims. (Cl. 260—41.5)

The present invention relates to improved compositions and the process of obtaining the same from natural and Butyl rubber. More particularly the invention relates to the heat processing and vulcanizing of rubber.

It is a specific object of the invention to provide an accelerator and anti-ozone agent which is of particular applicability in the formulation of white rubber products prepared from natural or synthetic rubber. It is a further object of the invention to provide a method of vulcanizing natural rubber formulations, particularly to obtain white products, while preventing the degradation and cracking of such products and enabling the same to be vulcanized without staining or discoloring.

It is also an object of the invention to heat process Butyl rubber and to vulcanize Butyl rubber with an improved accelerator and anti-degradation agent.

Butyl rubber is the well recognized and commonly employed generic name applied to a variety of elastic copolymers of isobutylene and small quantities of diolefins. The diolefins are usually selected so to produce a final product which possesses only a small percentage of the unsaturation of natural rubber. The content of combined diolefin hydrocarbon is usually not greater than about 15%. Due to this low unsaturation, Butyl rubber is very stable and for the same reason is difficult to vulcanize. The vulcanization reaction is not sluggish but the vulcanized products fail to possess the modulus of elasticity, resilience and resistance to flow required for many uses. These characteristics in the past have limited to a considerable extent the field of usefulness of Butyl rubber. It has now been found possible to supply means and methods for improving the characteristics mentioned and thereby to enlarge the area of usefulness of the vulcanized product.

An object of the present invention is to improve the properties of natural and synthetic elastomers and particularly of Butyl rubber vulcanizates by means of a special treating agent to provide a means to increase the modulus of elasticity and otherwise to improve the physical properties of the vulcanizate. A further object of the invention is to provide a process for simplifying the heat treatment of Butyl rubber as well as lowering the torsional hysteresis of the vulcanizates. A further object is to provide a special chemical compound which has been found to improve the properties of Butyl rubber when treated with the compound. A specific object is to promote the reaction between Butyl rubber and carbon black or other reinforcing pigments by chemical means by obtaining finer dispersion of the carbon black in the Butyl rubber.

It has been found in accordance with the present invention that cyclotetrathiotetraimine having the structural formula

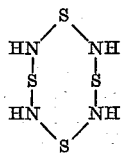

is very effective to modify the properties and promote the heat treating of Butyl rubber, with or without the presence of carbon black. The preparation of cyclotetrathiotetraimine is shown in an article by M. H. M. Arnold, "The Structure of $(SNH)_4$ and its Derivatives," Journal of the Chemical Society (London) 1938, pages 1596 and 1597. The thermal stability of the cyclotetrathiotetraimine for such high temperature processing is quite surprising, since the closely related compound, sulfur nitride, has been found to explode violently when heated to its melting point.

Heating Butyl rubber with carbon black in the presence of a small amount of cyclotetrathiotetraimine effects a reaction which not only increases the modulus of elasticity of the vulcanizates markedly but also retains reasonable elongations. For promoting reaction with carbon black, the proportion of carbon black should be at least 25 parts per hundred parts of Butyl rubber and preferably within the range of 25–60 parts of carbon black. The heating should be above 121° C. (250° F.) and preferably at 149–188° C. (300–370° F.) with heating times ranging from one minute to 16 hours. The compositions are masticated either during or after the heat treatment. If desired, additional cyclotetrathiotetraimine may be added with the vulcanizing ingredients to the rubber reacted with cyclotetrathiotetraimine.

The amount of cyclotetrathiotetraimine will vary depending upon the particular stock and the results desired. Amounts within the range of 0.01 to 3.0 parts by weight per 100 parts of rubber cover the useful range for most purposes. Optimum properties have been obtained with amounts within the range of 0.1 to 3.0 parts, a preferred range being from 0.1 to 1.0 per 100 parts of rubber.

One of the major problems of the rubber industry is the protection of vulcanizates of sulfur-vulcanizable rubbers against exposure cracking, that is degradation of the vulcanizate due to ozone while under static or dynamic stress. The problem is a serious one, particularly with respect to the service life of rubber tires, and is aggravated by the fact that in general chemical antioxidants have little or no value in protecting vulcanizates against deterioration by ozone. Although many and varied substances have been suggested and tried, not one has been found entirely satisfactory. Accordingly, rubber technologists have constantly sought improvements.

In accordance with this invention it has been found that cyclotetrathiotetraimine is an effective anti-exposure cracking agent (also called an anti-ozone agent) for natural and synthetic rubbers.

Cyclotetrathiotetraimine is particularly useful in the control of exposure cracking of the sulfur-vulcanizable synthetic rubber-like materials prepared by the polymerization of a conjugated diene compound, either alone or with other unsaturated compounds copolymerizable there-with. The synthetic rubbers which may be substantially improved in ozone resistance are polymers of the aliphatic conjugated diene compounds such as butadiene, isoprene, piperylene, dimethyl butadiene, ethyl butadiene, and the like either alone or with unsaturated monoolefinic compounds which contain the $CH_2=C<$ group such as the vinyl aromatics, namely styrene, α-methyl styrene, nuclear substituted styrenes, monochlorostyrene, dichlorstyrene, divinyl benzene, vinyl naphthalene, vinyl biphenyl, vinyl carbazole, 2-vinyl-5-ethyl pyridine, etc., and such compounds as acrylonitrile, methacrylonitrile, acrylic acid, methacrylic acid and esters thereof, methyl vinyl ketone and the like. A preferred group of rubbery copolymers are those containing at least 85% isobutylene and a minor amount of a conjugated diene hydrocarbon, such as isoprene or butadiene.

By the terms "vulcanized rubber" and "sulfur-vulcanizable rubber" as employed in the appended claims, unless otherwise modified, is meant natural as well as synthetic rubbers which are capable of vulcanization when heated with sulfur and includes latices and reclaims of such materials.

It is to be understood that other desired filling and compounding ingredients may be incorporated in the rubber base along with the cyclotetrathiotetraimine anti-exposure cracking agent. For example, there may be incorporated other accelerators, softeners, etc. as well as the customary rubber antioxidants.

Smaller amounts of the anti-exposure cracking agents may be employed than those indicated in the prior art. Amounts as small as 0.5% by weight on the rubber (natural and synthetic) of the compounds of this invention exhibit significant anti-exposure cracking properties. Amounts higher than those specifically shown, as for example 3% by weight on the rubber, may be employed depending upon the nature of the rubber, the other compounding ingredients used and the objectives of the compounder.

The following examples illustrate specific embodiments of the invention:

Example 1

The use of cyclotetrathiotetraimine as an anti-exposure cracking agent (also called an anti-ozone agent) in natural rubber formulations is shown in this example.

A master batch was employed based upon the following components, expressed in parts by weight:

| | |
|---|---|
| Smoked sheet (natural) rubber | 100 |
| Carbon black | 50 |
| Zinc oxide | 5 |
| Stearic acid | 3 |
| Asphaltic fluxing agent | 3 |

The above master batch was formulated for vulcanization utilizing the following added components, expressed in parts by weight relative to the 100 parts of the smoked sheet rubber described above.

| | Control | Reference Standard | With Anti-Ozone Agent |
|---|---|---|---|
| Sulfur | 1.0 | 1.0 | 1.0 |
| Curing agent (N-cyclohexyl-2-benzothiazylsulfenamide) | 0.5 | 0.5 | 0.5 |
| Xanthogen disulfide | 1.0 | 1.0 | 1.0 |
| 6-ethoxy-1, 2-dihydro-2, 2, 4-trimethyl-quinoline | | 1.5 | |
| Cyclotetrathiotetraimine | | | 1.5 |

The above formulations were vulcanized in molds at 122° C.

Example 2

The use of cyclotetrathiotetraimine in a white rubber formulation as a chemical promoter in the vulcanization of Butyl rubber compounded with silica in place of carbon black is shown in the present example. Two batches were prepared in order to provide a control for comparison with the test sample. The proportions of the master batch are set forth below:

| | Control | Test Sample |
|---|---|---|
| Butyl rubber | 100 | 100 |
| Finely-divided silica | 50 | 50 |
| Stearic acid | 2 | 2 |
| Glycerol | 3 | 3 |
| Cyclotetrathiotetraimine | 0 | 0.5 |

The master batch was first prepared without the cyclotetrathiotetraimine by mixing in a Banbury mixer at 120° F. The mixture was then discharged from the Banbury mixer and the promoter, cyclotetrathiotetraimine was then added on a rubber mill at 122° F. in order to provide the heat for the chemical reaction with the cyclotetrathiotetraimine. This addition occurred during a period of 5 minutes, followed by additional milling for a period of one half hour at 122° F., and further heat treatment on the mill for 10 minutes at 300° F. The final compounding in order to insure complete mixing of all of the components of the Butyl rubber, was carried out on a mill at 122° F. with the addition of the following components to each of the above mixtures:

| | |
|---|---|
| Dibutyl phthalate | 3 |
| Zinc oxide | 5 |
| Mercaptobutylthiazol | 1 |
| Tellurium diethyl dithiocarbamate | 1 |
| Sulfur | 2 |

The above compounded mixture was vulcanized in a mold utilizing a steam pressure of 60 lbs. and a temperature of 292° F. The properties of the vulcanizate were as follows:

| | Control | Test Sample |
|---|---|---|
| Modulus (300%), p.s.i | 430 | 510 |
| Modulus (500%), p.s.i | 1020 | 1250 |
| Torsional hysteresis, log. decr | 0.283 | 0.279 |

The above data indicate that the torsional hysteresis and the modulus are both improved by the use of the cyclotetrathiotetraimine. This is an indication that the chemical reactivity is improved with regard to the Butyl rubber and the cyclotetrathiotetraimine by the bonding of the silica to the rubber in the vulcanized product. The cyclotetrathiotetraimine is also found to be non-staining, so that it is of particular value in the manufacture of white rubber products such as side wall tires and in rubber toys.

Example 3

The use of cyclotetrathiotetraimine as a chemical modifier for Butyl rubber formulated with carbon black is shown in the present example. The Butyl rubber is first mixed in a Banbury mixer for 10 minutes at 300° F., after which the carbon black is added, and further mixing is carried out in the Banbury mixer for 10 minutes at 300° F. The Banbury charge is then dumped and the final compounding is carried out on a rubber mill at 122° F. utilizing the compounding ingredients set forth below. Curing of the Butyl rubber in order to vulcanize the mixture is carried out in molds utilizing a steam pressure of 45 lbs. and a temperature of 291° F.

|  | Control | Test Sample |
|---|---|---|
| Butyl rubber | 100 | 100 |
| Cyclotetrathiotetraimine | 0 | 0.5 |
| Carbon black | 15 | 15 |
| Medium processing channel black | 35 | 35 |
| Compounding Ingredients: |  |  |
| Zinc oxide | 5 | 5 |
| 2-benzothiazyl disulfide | 1 | 1 |
| Tetramethyl-thiuram disulfide | 1 | 1 |
| Sulfur |  |  |

The vulcanizates had the properties set forth below:

|  | Control | Test Sample |
|---|---|---|
| Modulus (300%), p.s.i. | 1,260 | 1,470 |
| Torsional Hys., Log. Decr. | 0.375 | 0.283 |

The above data indicate an improvement in the vulcanization of Butyl rubber by the chemical modification of the Butyl polymer as indicated by the torsional hysteresis.

*Example 4*

The use of cyclotetrathiotetraimine as a promoter in the heat treatment of Butyl rubber utilizing an oven treatment in contrast to a roll treatment is shown in the present example. In this method the rubber undergoes a preliminary reaction with the rubber and carbon black in the presence of the cyclotetrathiotetraimine when such mixture is heated. This preliminarily reacted material is then mixed with sulfur and other compounding ingredients for final vulcanization.

A mixture was prepared utilizing 100 parts of Butyl rubber in combination with 50 parts of furnace black as the control sample, and with the test sample having added to the above, 1.5 parts of cyclotetrathiotetraimine. The above mixtures were placed in a pan in an oven for four hours at 150° C. The mixture was then cooled and was compounded on a roll by adding thereto the following components:

| Zinc oxide | 5 |
|---|---|
| 2-benzothiazyl disulfide | 1 |
| Tetramethyl-thiuram disulfide | 1 |
| Sulfur | 2 |

The two formulations were then vulcanized in molds utilizing a steam pressure of 45 lbs. and a temperature of 144° C. (291° F.).

The physical properties of the finished vulcanizate are set forth below, reporting both the values for the oven treated and untreated samples.

|  | Time of Heat Treatment | Control | Test Sample |
|---|---|---|---|
| Modulus (300%) | 0 | 1,340 | 1,426 |
|  | 4 | 1,553 | 1,833 |
| Tors. Hyst., Log. Decr. | 0 | 0.358 | 0.378 |
|  | 4 | 0.356 | 0.286 |

The above data indicate that the oven heat treatment of the Butyl rubber, carbon black and the promoting agent, cyclotetrathiotetraimine, results in a bonding of the Butyl rubber with the carbon black, thus improving the physical properties, in particular the torsional hysteresis property.

What is claimed is:

1. The process which comprises heating to a temperature of at least 250° F. a vulcanizable, unsaturated, rubbery elastomer selected from the group consisting of homopolymers of conjugated dienes and copolymers of conjugated dienes with an ethylenically unsaturated monomer, and having cyclotetrathiotetraimine incorporated in the said elastomer, the proportion of the said cyclotetrathiotetraimine being from 0.1 to 3.0 parts by weight per 100 parts of the said elastomer.

2. A process in accordance with claim 1, in which the vulcanizable, unsaturated, rubbery elastomer is a homopolymer of a conjugated diene.

3. A process in accordance with claim 1 in which the vulcanizable, unsaturated, rubbery elastomer is natural rubber.

4. The process which comprises heating to a temperature of at least 250° F. a vulcanizable, unsaturated, rubbery elastomer selected from the group consisting of homopolymers of conjugated dienes and copolymers of conjugated dienes with an ethylenically unsaturated monomer, and having cyclotetrathiotetraimine incorporated in the said elastomer, the proportion of the said cyclotetrathiotetraimine being from 0.1 to 1.0 part by weight per 100 parts of the said rubbery elastomer.

5. The process which comprises mixing a rubbery copolymer of at least 85% by weight of isobutylene and a conjugated diene hydrocarbon, with carbon black, and cyclotetrathiotetraimine, the proportion of the said cyclotetrathiotetraimine being from 0.1 to 3.0 parts by weight per 100 parts of the said rubber, and heating the mixture at 250° F. to 370° F., and thereafter adding sulfur, mixing, and further heating to vulcanize the said rubber.

6. The process of improving the resistance to exposure cracking of a vulcanized rubber composition selected from the group consisting of homopolymers of conjugated dienes and copolymers of conjugated dienes with an ethylenically unsaturated monomer which comprises incorporating therein cyclotetrathiotetraimine, the proportion of the said cyclotetrathiotetraimine being from 0.1 to 3.0 parts by weight per 100 parts of the said rubber composition, and heating the mixture to a temperature in the range of from 250° F. to 370° F.

7. A vulcanized rubber composition selected from the group consisting of homopolymers of conjugated dienes and copolymers of conjugated dienes with an ethylenically unsaturated monomer, the said rubber composition containing cyclotetrathiotetraimine in the proportion of from 0.1 to 3.0 parts by weight per 100 parts of the said rubber composition.

8. A vulcanized rubber composition comprising a butadiene-styrene copolymer, the said rubber composition containing cyclotetrathiotetraimine in the proportion of from 0.1 to 3.0 parts per 100 parts of the said rubber composition.

9. A vulcanized rubber composition comprising natural rubber containing cyclotetrathiotetraimine in the proportion of from 0.1 to 3.0 parts by weight per 100 parts of the said rubber composition.

10. A vulcanized rubber composition comprising a copolymer of at least 85% isobutylene and a conjugated diene hydrocarbon, the said rubber composition containing cyclotetrathiotetraimine in the proportion of from 0.1 to 3.0 parts by weight per 100 parts of the said rubber composition.

11. A sulfur-vulcanizable rubber composition selected from the group consisting of homopolymers of conjugated dienes and copolymers of conjugated dienes with an ethylenically unsaturated monomer, the said rubber composition containing cyclotetrathiotetraimine in the proportion of from 0.1 to 3.0 parts by weight per 100 parts of the said rubber composition.

12. A vulcanizable rubber composition comprising a synthetic rubber-like homopolymer of an aliphatic conjugated diene, the said rubber composition containing cyclotetrathiotetraimine in the proportion of from 0.1 to 3.0 parts by weight per 100 parts of the said rubber composition.

13. The process which comprises heating to a temperature of at least 250° F. a vulcanizable, unsaturated, rubbery elastomer which is a copolymer of at least 85% by weight of isobutylene with a conjugated diene, and having cyclotetrathiotetraimine incorporated in the said elastomer, the proportion of the said cyclotetrathiotetraimine being from 0.1 to 3.0 parts by weight per 100 parts of the said elastomer.

14. The process which comprises heating to a temperature of at least 250° F. a vulcanizable, unsaturated, rubbery elastomer which is a copolymer of isoprene and at least 85% by weight of isobutylene, and having cyclotetrathiotetraimine incorporated in the said elastomer, the proportion of the said cyclotetrathiotetraimine being from 0.1 to 3.0 parts by weight per 100 parts of the said elastomer.

15. The process which comprises heating to a temperature of at least 250° F. a vulcanizable, unsaturated rubbery elastomer which is a copolymer of isoprene with at least 85% by weight of isobutylene, and having cyclotetrathiotetraimine incorporated in the said elastomer, the proportion of the said cyclotetrathiotetraimine being from 0.1 to 1.0 part by weight per 100 parts of the said rubbery elastomer.

No references cited.